United States Patent [19]

Inoue et al.

[11] Patent Number: 4,579,636

[45] Date of Patent: Apr. 1, 1986

[54] TWO-WAY CURABLE SILICON RUBBER COMPOSITION

[75] Inventors: Yoshio Inoue; Takehide Okami, both of Gunma, Japan

[73] Assignee: Shin-Etsu Chemical Co., Ltd., Tokyo, Japan

[21] Appl. No.: 728,566

[22] Filed: Apr. 29, 1985

[30] Foreign Application Priority Data

May 1, 1984 [JP] Japan ................................. 59-88181

[51] Int. Cl.$^4$ ............................................... C08F 2/46
[52] U.S. Cl. ...................................... 522/99; 528/15; 528/17; 528/18; 528/21; 528/30; 528/33; 427/54.1
[58] Field of Search .................... 204/159.13; 528/30, 528/33, 15, 17, 18, 21; 427/54.1

[56] References Cited

U.S. PATENT DOCUMENTS 4,064,027 12/1977 Gant ................................. 204/159.13
4,070,526 1/1978 Colquhoun et al. ............ 204/159.13
4,359,369 11/1982 Takamizawa et al. ......... 204/159.13

*Primary Examiner*—Melvyn I. Marquis
*Attorney, Agent, or Firm*—Toren, McGeady, Stanger, Goldberg & Kiel

[57] ABSTRACT

The silicone rubber composition of the invention essentially comprises (a) a silanolic hydroxy-terminated diorganopolysiloxane, (b) a hydrolyzable vinyl silane compound such as a vinyl trialkoxysilane and (c) an organopolysiloxane having at least two mercapto groups in the form of, for example, 3-mercaptopropyl groups, in a molecule. The composition can be cured by two different mechanisms of crosslink formation one by the condensation reaction between the silanol groups in (a) and the hydrolyzable groups in (b) in the presence of atmospheric moisture and the other between the vinyl groups in (b) and mercapto groups in (c) under irradiation with ultraviolet light. The two-way cruability of the composition greatly expands the application fields of the silicone rubber composition.

6 Claims, 1 Drawing Figure

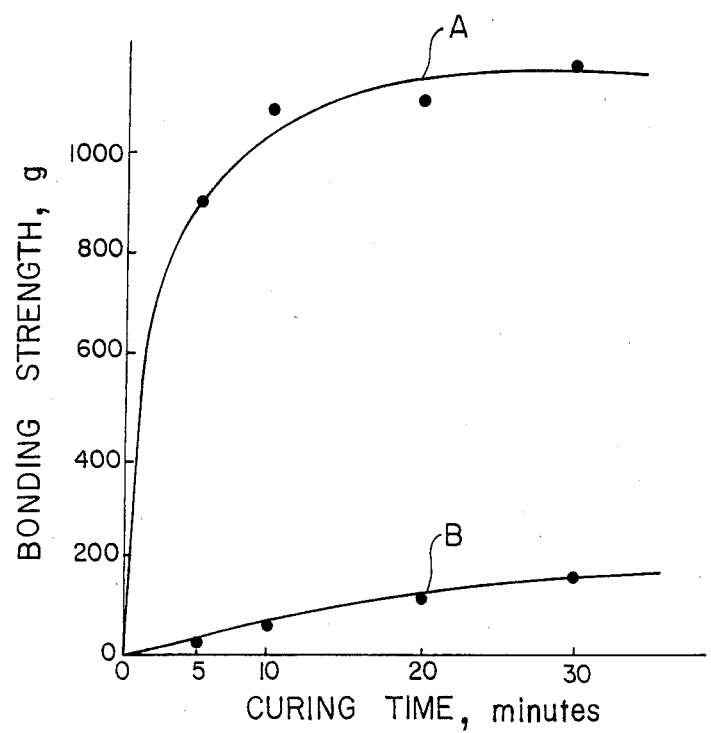
FIGURE

TWO-WAY CURABLE SILICON RUBBER COMPOSITION

BACKGROUND OF THE INVENTION

The present invention relates to a two-way curable silicone rubber composition or, more particularly, to a silicone rubber composition which is curable at room temperature by the irradiation with ultraviolet light or by the interaction with atmospheric moisture and useful as an adhesive or a sealing or caulking material.

There are known several types of room temperature curable silicone rubber compositions including those stable under a hermetically sealed condition but curable by the interaction with atmospheric moisture to give a cured silicone rubber and those curable by the irradiation with ultraviolet light. Compositions curable by different mechanisms for the crosslink formation are known and practically used among these classes of the silicone rubber compositions.

Each of these conventional room temperature curable silicone rubber compositions, however, has its own advantages and disadvantages. For example, A moisture-curable silicone rubber composition usually takes a considerably long time for complete curing or even for curing in the surface layer only which cannot be tack-free within a short time of several minutes or so because the curing thereof solely depends on the diffusion of the atmospheric moisture from the surface through the layer so that the room temperature curable silicone rubber compositions of this type cannot be used as an adhesive and sealing or caulking material of which curing within a short time is desired. The ultraviolet-curable silicone rubber compositions, on the other hand, have disadvantages that, although they are advantageous in respect of the rapid curing in the portion under direct irradiation with ultraviolet light, no curing of the composition is effected in the shaded portion or in the inner portion of a body formed of a composition colored with a pigment. When the layer of the composition has a relatively large thickness, in particular, curing is obtained only in the surface layer and the composition is left uncured in the depth of the layer scarcely reached by the ultraviolet.

SUMMARY OF THE INVENTION

It is therefore an object of the present invention to provide a novel and improved room temperature curable silicone rubber composition which is curable by both of the curing mechanisms of the interaction with the atmospheric moisture and ultaviolet irradiation so that the composition is rapidly cured by the latter mechanism in the surface layer which is reached by the ultraviolet light and subsequently cured in the shaded portion and depth of a thick layer by the former mechanism.

Thus, the two-way curable silicone rubber composition of the invention comprises:

(a) 100 parts by weight of a diorganopolysiloxane of a substantially linear molecular structure terminated at both molecular chain ends each with a hydroxy group directly bonded to the terminal silicon atom;

(b) from 0.5 to 30 parts by weight of a hydrolyzable vinylsilane represented by the general formula $CH_2+CHSiX_3$, in which X is a hydrolyzable group, or a partial hydrolyzate thereof;

(c) a mercapto-containing organopolysiloxane having at least two mercapto groups in a molecule in such an amount that from 0.01 to 100 moles or, preferably, from 0.5 to 20 moles of the mercapto groups are provided per mole of the component (b);

(d) up to 10 parts by weight of a curing catalyst;

(e) from 0.01 to 20 parts by weight of a photosensitizer; and (f) up to 300 parts by weight of a filler.

BRIEF DESCRIPTION OF THE DRAWING

The FIGURE illustrates the adhesive bonding strength in g between two butt-jointed aluminum blocks with the inventive composition as determined in Example 4 as a function of the moisture-curing time in minutes.

DETAILED DESCRIPTION OF THE PREFERRED EMBODIMENTS

As is described above, the silicone rubber composition of the invention comprises the components (a) to (f), of which the components (d) and (f) are optionally added to the composition. The composition is particularly useful as an adhesive or as a sealing or caulking material which is first rapidly cured by the irradiation with ultraviolet to exhibit the performance of initial sealing or adhesive bonding by the ultraviolet-induced viscosity increase or crosslinking in the surface layer followed by the condensation reaction at the molecular chain terminals of the component (a) to effect curing of the composition to the very depth of a thick layer by the mechanism of moisture curing exhibiting a stabilized effect of sealing or adhesive bonding.

The component (a), which is a silanol-terminated diorganopolysiloxane, is well known and widely used in various types of moisture-curable silicone rubber compositions and represented by the general formula $HO-SiR_2-O)_nH$. In the formula, each R is, independently from the others, a substituted or unsubstituted monovalent hydrocarbon group selected from the class consisting of alkyl groups such as methyl, ethyl and propyl groups, alkenyl groups such as vinyl, allyl and 1-propenyl groups, aryl groups such as phenyl and tolyl groups and cycloalkyl groups such as cyclohexyl group as well as those substituted groups obtained by the replacement of a part or all of the hydrogen atoms in the above named hydrocarbon groups with substituents such as halogen atoms, cyano groups and the like. The suffix n, which is the so-called degree of polymerization, should be 5 or larger corresponding to a viscosity of the diorganopolysiloxane in the range from 25 to 500,000 centistokes or, preferably, from 1000 to 100,000 centistokes at 25°C.

The component (b) essentially used in the inventive composition is a hydrolyzable vinyl silane compound represented by the general formula $CH_2=CHSiX_3$, in which X is a hydrolyzable group, or a partial hydrolyzate thereof. Three of the hydrolyzable groups X in a molecule may not be the same ones but may be different independently from the others. Suitable hydrolyzable groups include the classes of alkoxy groups, acyloxy groups, ketoxime groups, amide groups, amino groups, aminoxy groups, ester groups, alkenyloxy groups and the like, each class further comprising several particular groups from the practical standpoint.

Exemplary of the typical hydrolyzable vinylsilane compound are vinyl trimethoxysilane, vinyl triethoxysilane, vinyl triacetoxysilane, vinyl tri(methyl ethyl ketoxime)silane, vinyl tri(N-methylacetoamido)silane, vinyl tri(diethylaminoxy)silane, vinyl tri(ε-caprolactam)silane, vinyl tri(methyl crotonate ester)silane, vinyl tri(isopropenyloxy)silane, vinyl dimethoxy isopropenyloxysilane and the like. Vinyl-containing hydrolyzable organopolysiloxane compounds also can be used in place of the component (b) provided that the number of the hydrolyzable groups therein is at least three in a molecule such as 1-vinyl-3,5,7-triisopropenyloxy-1,3,5,7-tetramethyl cyclotetrasiloxane and the like.

The amount of the component (b) in the inventive composition should be in the range from 0.5 to 30 parts by weight or, preferably, from 2 to 15 parts by weight per 100 parts by weight of the component (a). When the amount of the component (b) is smaller than the above range, no sufficiently high crosslinking density can be obtained in the composition so that the composition cannot be imparted with fully rubber-like properties. When the amount of the component (b) is in excess of the above range, on the other hand, the cured composition may have a too large hardness to be useful as an adhesive or a sealing material.

The component (c) is a mercapto-containing organopolysiloxane which serves to interact with the vinyl groups in the component (b) and to form crosslinks when the composition is irradiated with ultraviolet light so that the composition is imparted with an increased consistency to be gum-like necessary to the appearance of incipient sealing power. In this regard, the organopolysiloxane should have at least two mercapto groups in a molecule and the mercapto group is preferably bonded to the silicon atom in the form of a mercaptoalkyl group or, more preferably, in the form of a 3-mercaptopropyl group.

Exemplary of the mercapto-containing organopolysiloxanes suitable as the component (c) are those expressed by the following structural formulas, denoting a methyl, a phenyl, a 2-mercaptoethyl and a 3-mercaptopropyl group with the symbols Me, Ph, Met and Mp, respectively:

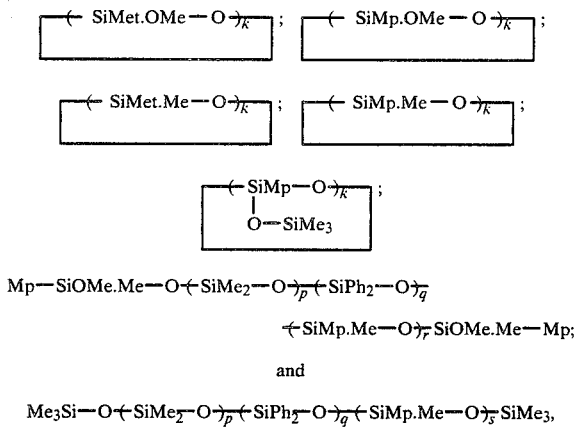

Mp—SiOMe.Me—O$\leftarrow$SiMe$_2$—O$\rightarrow_p\leftarrow$SiPh$_2$—O$\rightarrow_q$ $\leftarrow$SiMp.Me—O$\rightarrow_r$SiOMe.Me—Mp;

and

Me$_3$Si—O$\leftarrow$SiMe$_2$—O$\rightarrow_p\leftarrow$SiPh$_2$—O$\rightarrow_q\leftarrow$SiMp.Me—O$\rightarrow_s$SiMe$_3$, in which k is a positive integer of 3 or larger, p, q and r are each zero or a positive integer and s is a positive integer of 2 or larger. These mercapto-containing organopolysiloxanes may be used either singly or as a combination of two kinds or more according to need. The amount of the mercapto-containing organopolysiloxane as the component (c) in the inventive composition should be sufficient to give from 0.01 to 100 moles or, preferably, from 0.5 to 20 moles of the mercapto groups per mole of the vinyl groups in the component (b) or, since the hydrolyzable vinylsilane has only one vinyl group per molecule, per mole of the component (b) per se. When the amount of the component (c) is smaller than the above range, the ultraviolet irradiation causes only insufficient incipient viscosity increase. When the amount of the component (c) is in excess of the above range, on the other hand, the cured composition may have an excessively high hardness after complete curing.

The component (d) is a curing catalyst which is an optional ingredient in the inventive composition and admixed therewith according to need depending on the type of the other components in an amount up to 10 parts by weight per 100 parts by weight of the component (a). This component serves to accelerate the crosslink formation by the condensation reaction between the components (a) and (b) and may be selected from those well known in the art including metal salts of organic acids such as dibutyltin dilaurate, dibutyltin dioctoate, iron stearate, lead octoate and the like, titanate esters such as tetra(isopropyl) titanate and the like, chelate compounds of titanium such as acetylacetonato titanium and the like, and so on. When the component (b) is vinyl tri(isopropenyloxy)silane mentioned above, in particular, 3-(tetramethylguanidino)propyl trimethoxysilane, 3-(tetramethylguanidino)propyl tris(trimethoxysilyl)silane and the like guanidine derivatives may be useful as the component (d). When the component (b) is vinyl tri(cyclohexylamino)silane, the component (d) is not essential in the composition.

The component (e) is a photosensitizer which serves to accelerate the reaction between the vinyl groups in the component (b) and the mercapto groups in the component (c) under irradiation with ultraviolet light. Various compounds are known as effective for accelerating such an ultraviolet-induced reaction including, for example, acetophenone, propiophenone, benzophenone, xanthone, fluorene, fluorenone, benzaldehyde, anthraquinone, triphenylamine, carbazole, 3-methylacetophen-one, 4-methylacetophenone, 3-bromoacetophenone, 4-allylacetophenone, 1,4-di-acetylbenzene, 3-methoxybenzophenone, 4-methylbenzophenone, 4-chlorobenzophenone, 4,4'-dimethoxybenzophenone, 4-chloro-4'-benzyl benzophenone, 3-chloroxanthone, 3,9-dichloroxanthone, 3-chloro-8-nonylxanthone, benzoin, benzoin methyl ether, benzoin isobutyl ether, bis(4-dimethylaminophenyl)ketone, benzyl methoxy ketal, 2-chlorothioxanthone and the like. The component (e) is effective in the inventive composition even when the amount thereof is very limited since the role expected to this component is merely a slight activation of the composition to ultraviolet light. The amount thereof is usually in the range from 0.01 to 20 parts by weight or, preferably, from 0.1 to 5 parts by weight per 100 parts by weight of the component (a).

The component (f), which is also an optional ingredient in the inventive composition, is a filler which serves to impart an adequate mechanical property to the inventive composition or a cured body thereof. Exemplary of suitable fillers as the component (f) are fumed silica, calcined silica, precipitated silica, fumed titanium dioxide, carbon black, calcium carbonate, diatomaceous earth and calcium silicate as well as those fillers obtained by the hydrophobic treatment of the above named fillers with an organochlorosilane, organopolysiloxane, hexamethyldisilazane and the like. The amount of the component (f), when added, should not exceed 300 parts by weight per 100 parts by weight of the component (a) since a composition compounded with a larger amount of the filler than above may have a poor flowability to cause difficulties in handling and give a cured material having an excessively high elastic modulus.

The silicone rubber composition of the invention can readdily be prepared by uniformly blending the components (a) to (f) each in a calculated and weighed amount in a dry atmosphere. The thus obtained silicone rubber composition has two-way curability by two different mechanisms one by the ultraviolet-induced reaction between the components (b) and (c) and the other by the condensation reaction between the component (a) and (b). Therefore, the inventive silicone rubber composition has a wide applicability in a variety of industrial fields as, for example, an adhesive, sealing or caulking material, FIPG material, surface-releasing coating agent, insulation and coating material on electric wires and devices, encapsulating agent of electronic devices, coating agent in lithographic techniques and on fabric materials and the like, of which rapid curing on the surface is essential but no high velocity is required for complete curing of the composition to the depth of a thick layer. In particular, the inventive composition can be cured satisfactorily as a FIPG material in automobiles and the like having a relatively wide clearance to be sealed since the viscosity or consistency of the inventive composition can be rapidly increased by the ultraviolet irradiation to exhibit the sealing power within only a few minutes so that the composition filling the gap can withstand the internal pressure which acts on the composition outwardly. It is of course optional that the inventive composition is diluted by the admixture of a suitable organic solvent to have a reduced viscosity or consistency suitable for use as a coating agent or a primer.

It is also optional that the inventive silicone rubber composition is admixed with various kinds of other additives known in the art of silicones according to need with an object to modify or control the respective properties including, for example, coloring agents, heat- and cold-resistance improvers, thixotropy modifiers, dehydrating agents, flame retardants, oil resistance improvers, adhesion aids and the like.

In the following, the silicone rubber composition of the invention is described in more detail by way of examples, in which the expression of "parts" always refers to "parts by weight" and the values of viscosity are all the values obtained by the measurement at 25° C.

EXAMPLE 1

A silicone rubber composition, which is referred to as Composition I hereinbelow, was prepared first by uniformly blending 100 parts of a dimethylpolysiloxane having a viscosity of 20,500 centistokes and terminated at both molecular chain ends each with a silanolic hydroxy group, 12 parts of a fumed silica filler having a silane-treated hydrophobic surface and 0.2 part of dibutyltin dioctoate and then by further admixing, under an anhydrous condition, 7 parts of vinyl tri(methyl ethyl ketoxime)silane, 3.5 parts of a mercapto-containing organopolysiloxane having a viscosity of 35 centistokes which was a partial hydrolyzate of 3-mercaptopropyl methyl dimethoxysilane and 1.0 part of benzoin isobutyl ether.

The thus prepared Composition I was shaped into sheets of each 120 mm by 120 mm by 2 mm dimensions and one of them was exposed to ultraviolet light from an ultraviolet irradiator having two lamps each of a 2 kilowatts output to give a dose of 10 Cal/cm$^2$. The sheet was found to have been cured to a depth of 0.6 mm from the surface. Separately, another sheet was kept in dark for 24 hours at 23° C. in an atmosphere of 55% relative humidity and found to have been fully cured throughout the thickness by the mechanism of moisture curing.

Test specimens for the measurements of the mechanical properties were prepared by the ultraviolet curing, by the moisture curing and by the ultraviolet curing followed by the moisture curing of the sheets of the Composition I under the same conditions as in the above described ultraviolet curing and moisture curing excepting the increase of the ultraviolet dose to 30 Cal/cm$^2$ and extension of the moisture curing time to 48 hours and the hardness, ultimate elongation at break and tensile strength of these cured rubber sheets were determined according to the procedure specified in JIS K 6301 to give the results shown in Table 1 below.

TABLE 1

|  | Ultraviolet curing | Moisture curing | Ultraviolet curing + moisture curing |
|---|---|---|---|
| Hardness (JIS) | 20 | 21 | 25 |
| Elongation, % | 280 | 300 | 250 |
| Tensile strength, kg/cm$^2$ | 10 | 12 | 20 |

EXAMPLE 2

A silicone rubber composition, which is referred to as Composition II hereinbelow, was prepared by uniformly blending 100 parts of a diorganopolysiloxane having a viscosity of 30,800 centistokes as composed of 95% by moles of dimethylsiloxane units Me$_2$SiO and 5% by moles of diphenylsiloxane units Ph$_2$SiO and terminated at both molecular chain ends each with a silanolic hydroxy group, 13 parts of a silane-treated hydrophobic fumed silica filler, 3.0 parts of vinyl tri(isopropenyloxy)silane, 0.5 part of 3-(tetramethylguanidino)propyl trimethoxysilane, 5.0 parts of the same mercapto-containing organopolysiloxane as used in Example 1 and 0.5 part of benzophenone.

The Composition II was shaped into a 120 mm by 120 mm by 2 mm sheet which was exposed to ultraviolet light under the same conditions as in Example 1 to give a dose of 30 Cal/cm$^2$ to be cured to a depth of 1.6 mm from the surface. Thereafter, the thus ultraviolet-cured sheet was kept in dark for 48 hours at 23° C. in an atmosphere of 55% relative humidity so that curing was complete over the whole thickness. The thus cured silicone rubber sheet had mechanical properties of a hardness of 22 in the JIS scale, an ultimate elongation at break of 340% and a tensile strength of 16 kg/cm$^2$ as determined according to JIS K 6301.

EXAMPLE 3

A silicone rubber composition, which is referred to as Composition III hereinbelow, was prepared by uniformly blending 100 parts of a diorganopolysiloxane having a viscosity of 21,000 centistokes as composed of 95% by moles of dimethylsiloxane units and 5% by moles of diphenylsiloxane units and terminated at both molecular chain ends each with a silanolic hydroxy group, 13 parts of a silane-treated hydrophobic fumed silica filler, 3.0 parts of vinyl tri(isopropenyloxy)silane, 0.5 part of 3-(tetramethylguanidino)propyl trimethoxysilane and 1.0 part of a mercapto-containing cyclic organopolysiloxane 1,3,5,7,9-penta(3-mercaptopropyl)-1,3,5,7,9-penta(trimethylsiloxy) cyclopentasiloxane.

The Composition III was shaped into sheets of each 120 mm by 120 mm by 2 mm dimensions and subjected to curing by the ultraviolet irradiation, by the exposure to moisture or by the ultraviolet irradiation followed by exposure to moisture each under the same conditions as in Example 1, in which the ultraviolet dose in the curing by ultraviolet irradiation alone was 30 Cal/cm$^2$, the length of exposure time to moisture-containing atmosphere in the moisture-curing alone was 48 hours and the ultraviolet dose preceding the 48 hours of moisture curing was 10 Cal/cm$^2$, respectively. The mechanical properties of the thus cured silicone rubber sheets determined according to JIS K 6301 were as shown in Table 2 below.

TABLE 2

|  | Ultraviolet curing | Moisture curing | Ultraviolet curing + moisture curing |
|---|---|---|---|
| Hardness (JIS) | 18 | 18 | 22 |
| Elongation, % | 250 | 270 | 200 |
| Tensile strength, kg/cm$^2$ | 10 | 11 | 10 |

EXAMPLE 4

A silicone rubber composition, which is referred to as Composition IV hereinbelow, was prepared by admixing 100 parts of the Composition III prepared in Example 3 with 1.0 part of 3-aminopropyl triethoxysilane as an adhesion aid. By use of this Composition IV as an adhesive, two aluminum blocks of each 50 mm by 50 mm by 5 mm dimensions were bonded in a butt-joint manner at the 50 mm by 5 mm surfaces with a 10 mm long portion of the Composition IV, which portion was irradiated with ultraviolet light under the same conditions as in Example 1 to give a dose of 10 Cal/cm$^2$ followed by keeping in dark at 23° C. in an atmosphere of 55% relative humidity for a varied length of time from 5 to 30 minutes. The adhesive bonding strength between the aluminum blocks in g, i.e. the force required for pulling apart the aluminum blocks, was determined and illustrated as a function of the time of the moisture curing by the curve A in the FIGURE of the accompanying drawing. For comparison, the same adhesive bonding test as above was performed excepting the omission of the ultraviolet irradiation to give the results illustrated by the curve B in the same FIGURE.

What is claimed is:

1. A two-way curable silicone rubber composition which comprises:
   (a) 100 parts by weight of a diorganopolysiloxane of a substantially linear molecular structure terminated at both molecular chain ends each with a hydroxy group directly bonded to the terminal silicon atom;
   (b) from 0.5 to 30 parts by weight of a hydrolyzable vinylsilane represented by the general formula $CH_2=CHSiX_3$, in which X is a hydrolyzable group, or a partial hydrolyzate thereof;
   (c) a mercapto-containing organopolysiloxane having at least two mercapto groups in a molecule in such an amount that from 0.01 to 100 moles of the mercapto groups are provided per mole of the component (b);
   (d) up to 10 parts by weight of a curing catalyst;
   (e) from 0.01 to 20 parts by weight of a photosensitizer; and
   (f) up to 300 parts by weight of a filler.

2. The two-way curable silicone rubber composition as claimed in claim 1 wherein the component (a) has a viscosity in the range from 25 to 500,000 centistokes at 25° C.

3. The two-way curable silicone rubber composition as claimed in claim 1 wherein the hydrolyzable group denoted by X in the component (b) is selected from the class consisting of alkoxy groups, acyloxy groups, ketoxime groups, amide groups, amino groups, aminoxy groups, ester groups and alkenyloxy groups.

4. The two-way curable silicone rubber composition as claimed in claim 1 wherein the mercapto group in the component (c) is bonded to the silicon atom in the form of a mercaptoalkyl group.

5. The two-way curable silicone rubber composition as claimed in claim 4 wherein the mercaptoalkyl group is a 3-mercaptopropyl group.

6. The two-way curable silicone rubber composition as claimed in claim 1 wherein the amount of the mercapto-containing organopolysiloxane as the component (c) is in such a range that from 0.5 to 20 moles of the mercapto groups are provided per mole of the component (b).

* * * * *